Figure 1:
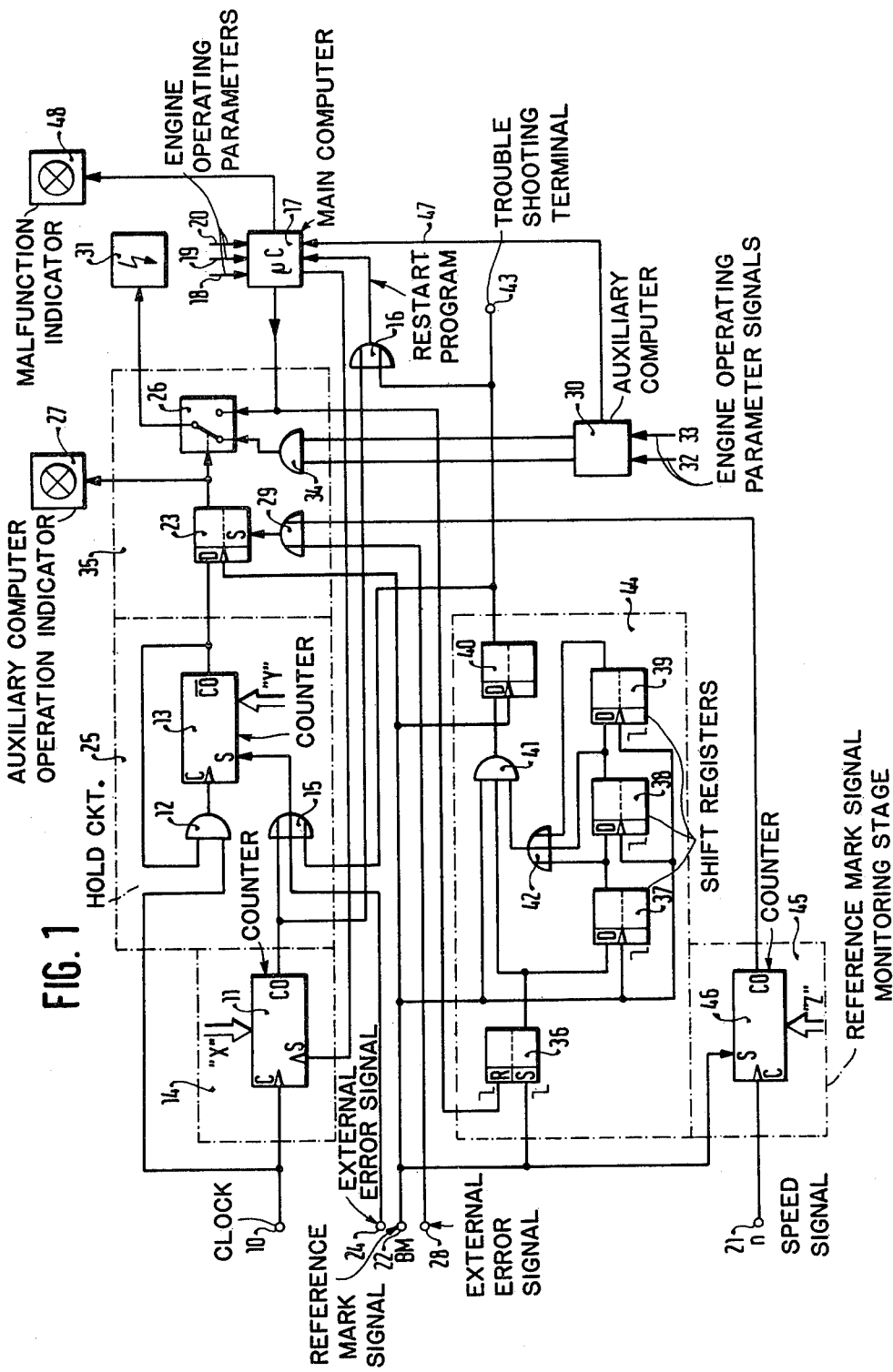

United States Patent [19]

Nitschke et al.

[11] 4,444,048

[45] Apr. 24, 1984

[54] APPARATUS FOR DETECTING MALFUNCTION IN CYCLICALLY REPETITIVE PROCESSES IN AN INTERNAL COMBUSTION ENGINE

[75] Inventors: Werner Nitschke, Ditzingen; Alfred Schulz, Oberriexingen; Klaus Glöckler, Asperg; Heinrich Baumann, Schwieberdingen; Peter Dilger, Neuried; Wilfried Venzke, Moglingen, all of Fed. Rep. of Germany

[73] Assignee: Robert Bosch GmbH, Stuttgart, Fed. Rep. of Germany

[21] Appl. No.: 422,381

[22] Filed: Sep. 24, 1982

Related U.S. Application Data

[63] Continuation of Ser. No. 205,270, Nov., 1980, abandoned.

[30] Foreign Application Priority Data

Nov. 10, 1979 [DE] Fed. Rep. of Germany ....... 2945543

[51] Int. Cl.³ ........................................... G01M 15/00
[52] U.S. Cl. ....................................... 73/117.3; 371/9
[58] Field of Search .................. 73/117.3, 118, 119 A; 371/5, 9; 364/551; 123/612

[56] References Cited

U.S. PATENT DOCUMENTS

| | | | |
|---|---|---|---|
| 3,964,302 | 6/1976 | Gordon et al. | 73/117.3 |
| 4,031,372 | 6/1977 | Davis | 235/151.21 |
| 4,032,757 | 6/1977 | Eccles | 235/150.2 |
| 4,063,539 | 12/1977 | Gorille et al. | 123/117 D |
| 4,099,495 | 7/1978 | Kiencke et al. | |
| 4,133,323 | 1/1979 | Adler | 123/117 R |
| 4,149,408 | 4/1979 | Ezoe et al. | 73/118 |
| 4,153,198 | 5/1979 | Eki et al. | 235/303.3 |
| 4,174,688 | 11/1979 | Honig et al. | 123/117 D |
| 4,198,936 | 4/1980 | Pagel et al. | 123/117 R |
| 4,217,868 | 8/1980 | Grather et al. | 123/416 |
| 4,242,728 | 12/1980 | Hartford | 364/431 |
| 4,245,315 | 1/1981 | Barman et al. | 364/431 |
| 4,253,443 | 3/1981 | Seeger et al. | 123/609 |
| 4,255,789 | 3/1981 | Hartford et al. | 364/431 |
| 4,287,565 | 9/1981 | Haubner et al. | 364/580 |
| 4,325,251 | 4/1982 | Kanegae | 73/119 A |
| 4,326,410 | 4/1982 | Bukhtiyarov et al. | 73/117.3 |

FOREIGN PATENT DOCUMENTS 2039372 8/1980 United Kingdom .

Primary Examiner—Jerry W. Myracle
Attorney, Agent, or Firm—Frishauf, Holtz, Goodman & Woodward

[57] ABSTRACT

Repetitive processes in internal combustion engines which are dependent upon the values of particular parameters are controlled either by a main computer or an auxiliary computer. Switching from the main to the auxiliary computer takes place if a sequence error detecting stage detects errors in the desired alternation between the main control signals furnished by the main computer and reference mark signals indicative of predetermined angular positions of a shaft of the engine. Specifically, the system is switched to operate under control of the auxiliary computer if such an alternation error occurs again within a predetermined number of cycles. The switching can also take place as a result of missing reference mark signals and as a result of the absence of monitoring signals indicative of correct operation of the main computer program.

13 Claims, 2 Drawing Figures

APPARATUS FOR DETECTING MALFUNCTION IN CYCLICALLY REPETITIVE PROCESSES IN AN INTERNAL COMBUSTION ENGINE

This is a continuation of application Ser. No. 205,270 filed Nov. 10, 1980, now abandoned.

The present invention relates to apparatus which controls cyclically operating processes in an internal combustion engine, such as, for example, the ignition process, the fuel injection process and/or transmission controls. In particular, it relates to error detecting apparatus for such cyclically operable equipment.

BACKGROUND AND PRIOR ART

Known apparatus for controlling the above-mentioned process includes either a programmable or hard wired computer. Such systems are known from German Patent DE-PS No. 2 504 843, and German Patent Publications DE-AS No. 2 539 113 and DE-OS No. 2 655 948 (to which U.S. Pat. Nos. 4,063,539, 4,099,495, and 4,174,688 correspond). Since such computers consist of many components and may have a relatively complicated structure, a multiplicity of errors can occur. For this reason, an auxiliary, redundant control system is provided which operates only upon malfunction of the main computer. Generally, such an auxiliary control system is sufficient only to allow the operation of the internal combustion engine until such time as the next repair location can be reached.

In the known system, monitoring signals are furnished periodically by the program as it is being executed. These monitoring signals are monitored by an error detecting circuit. The auxiliary computing apparatus is switched in only if there is an error in the program as signified by a lack of monitoring signals. However the possibility exists that no control signals are applied to the cyclically operative apparatus by the main computer even though its program seems correctly operative. Further, in the known system, no error is detected if the program proceeds correctly, but not in proper synchronism to reference mark signals which are being received for timing the cyclical operation.

THE INVENTION

It is an object of the present invention to furnish error detecting apparatus which reliably detect most of the errors occurring in computer controlled cyclically operative parts of an internal combustion engine. It is a further object to furnish apparatus which will automatically switch in auxiliary computing apparatus in response to error signals indicative of intolerable errors while permitting continued operation of the main computer in the presence of less serious errors.

It is assumed that, in the operation of the system, a reference mark signal generated when a rotating shaft of the engine has a predetermined angular position, when the system is properly operative, alternate with a main control signal. Therefore an error detecting stage is provided which furnishes a first error signal in the absence of alternation between the main control signal and the reference mark signals. First timing means, namely a hold circuit, are provided which receive the first error signal and furnish an output error signal which will result in the switching from the main computing means to the auxiliary computing means if the absence of alternation between the main control signals and the reference mark signals reoccurs during a predetermined number of cycles following the cycle in which the first error signal was generated.

Further error detecting stages can be provided. In a particularly preferred embodiment the absence of reference mark signals and the absence of monitoring signals indicative of the correct running of the program of the main computer will also be detected. These error detecting stages are preferably embodied in counters which are set to a predetermined count by the monitoring signals and the reference mark signals, respectively, and which are then counted down at a rate depending upon the frequency of speed signals indicative of engine speed in the case of the reference mark signals and at a predetermined rate in the case of the program monitoring signals.

A hold circuit may be provided to prevent excessively frequent switching between the main and the auxiliary computer.

Preferably, error signals resulting from seeming computer malfunction are also used to restart the main computer program. If the main computer thereafter operates correctly, the control is switched back from the auxiliary computer.

The program of the main computer may also contain steps for self-monitoring and for monitoring the auxiliary computer. In this case relatively minor errors that would result, for example, from malfunction of a sensor of an operating parameter which is not absolutely essential to operation of the system will cause an indicator lamp to light, but will allow the main computer to continue without any switching to the auxiliary computer. An error in the auxiliary computer will be indicated by a separate indicator lamp. Switching from the main to the auxiliary computer can of course also be indicated to the operator.

DRAWINGS ILLUSTRATING A PREFERRED EMBODIMENT

Figure 2:
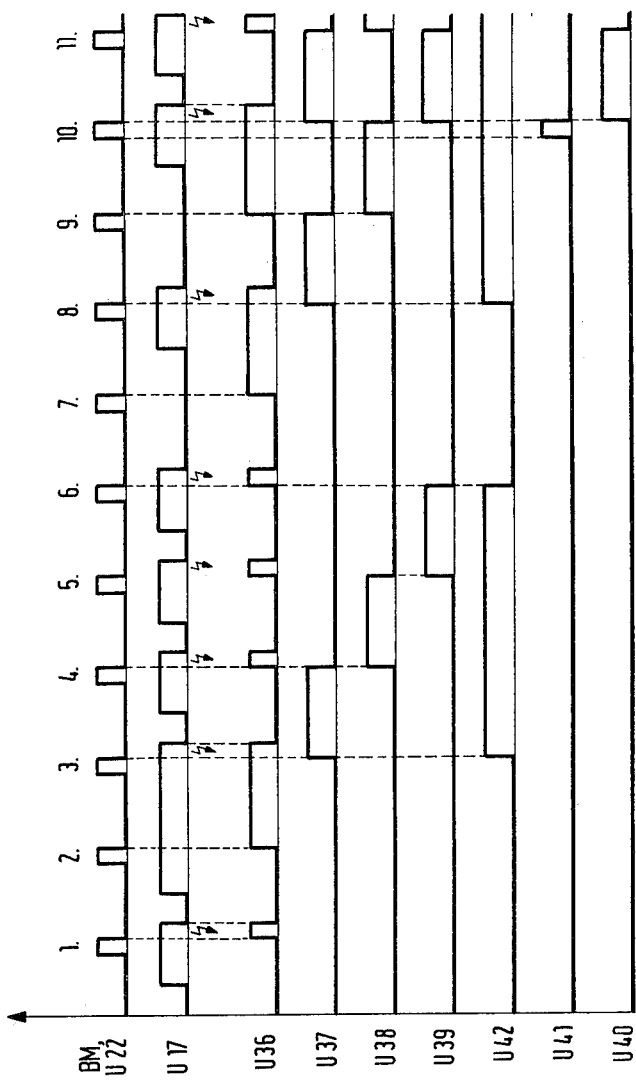

FIG. 1 is a circuit diagram of the error-detecting apparatus according to the present invention; and FIG. 2 shows wave forms at selected points of the circuit of FIG. 1.

In FIG. 1, a clock signal is applied to a terminal 10. The clock signal at terminal 10 is applied to the counting input of a counter 11 and one input of an AND gate 12. The output of AND gate 12 is connected to the counting input of a counter 13. Counters 11 and 13 each may be set to a predetermined number in response to a signal applied at a set inputs. Counter 11 is indicated as being set to a number "X", while counter 13 is set to a number "Y" in response to a signal at its S input. The carry output of counter 11 from terminal CO is connected through an OR gate 15 to the set input S of counter 13, and through an OR gate 16 to the restart input of main computer 17. Preferably, main computer 17 is a microcomputer. The construction of such a microcomputer, as well as its operation for computing the ignition timing, injection time intervals, and/or different transmission control processes are well known to one skilled in the art. In order to carry out the necessary computations, the values of different operating parameters of the engine must be applied to the computer. This is indicated by arrows 18–20. Such operating parameters include, for example, engine speed n e.g. arrow 18 and signals indicative of the then-present rotational position of the crankshaft of the engine e.g. arrow 19. The latter are referred to as reference mark signals herein. The speed signals and the reference mark signals are also applied to terminals 21 and 22 respectively. The inverting carry output of counter 13 is connected both to one input of an AND gate 12 and to the D input of a flip-flop 23. External signals may also be applied to a terminal 24 which, in turn, is connected to a further input of OR gate 15. Units 12, 13 and 15 together constitute a hold circuit 25. Hold circuit 25 provides a minimum switching interval, i.e. prevents excessively frequent switching between the main and the auxiliary computing circuits.

The clock input of flip-flop 23 is connected to reference mark signal terminal 22. The output of flip-flop 23 is connected to the control input of a switching circuit 26 and is further connected to an indicator 27. A terminal 28 is connected through an OR gate 29 to the set input S of flip-flop 23. Switching circuit 26 selectively connects either the control signals furnished by computer 17 or the control signals furnished by auxiliary computer 30 to one or more output stages 31. Output stage 31 is pictured as an ignition output stage. However, other types of stages, for example stages for controlling the amount of fuel injected during each cycle or transmission control stages may be affected. If a plurality of such output stages is to be controlled, the switching circuit 26 must of course have a number of outputs. As indicated by arrows 32 33, signals indicative of the values of then-present operating parameters of the engine are also applied to auxiliary computer 30. In the simplest case, such an auxiliary computer can be a timing circuit. If the process to be controlled is the ignition, a timing circuit forming the element 30 furnishes the signal which determines the time that a switch connected in series with the primary winding of an ignition coil is closed. In the case of fuel injection, the timing circuit specifies the time during each cycle in which injection of the fuel takes place. Of course the auxiliary computer may be more complicated. A somewhat more complicated system for computing the ignition timing is, for example, disclosed in German Patent Disclosure Documents DE-OS Nos. 2 640 791 and 2 900 480 (to which U.S. Pat. Nos. 4,135,323 and 4,253,443 correspond). Simple systems for regulating the closure time of the switch in series with the primary winding are described in German Patent Disclosure Documents DE-OS No. 2 711 432, DE-OS No. 2 711 894, and DE-OS No. 2 746 885 (to which U.S. Pat. Nos. 4,217,868, 4,198,936, 4,174,696 correspond). A simple system wherein two or more fixed changes in the angle at which ignition takes place can be provided in dependence upon engine speed is disclosed in German Patent Disclosure Document DE-OS No. 2 807 499.

For the case shown in FIG. 1, two outputs of auxiliary computer 30 are connected through an AND gate 34 to switching circuit 26. One of the outputs furnishes the control signal, while the other output furnishes a quiescent ignition coil current shut-off signal. A circuit for quiescent current shutoff is known from German Patent Disclosure Document DE-OS No. 2 746 885, to which U.S. Pat. No. 4,174,696 corresponds). The quiescent current shutoff signal causes the control signal to be blocked for engine speeds of, for example, less than 100 revolutions per minute.

Terminal 22, which carries the reference mark signals, is also connected to the set input S of an RS flip-flop 36 and to the clock inputs of four D flip-flops 37–40. The reset input R of flip-flop 36 is connected to the control output of computer 17. Flip-flop 36 has dynamic inputs which, as do the clock inputs of flip-flops 37–40, react only to the trailing edges of pulses applied thereto. The output of flip-flop 36 is connected on the one hand to the D input of flip-flop 37 and, on the other, through an AND gate 41 to the D input of a flip-flop 40. Terminal 22 is connected to a further input of AND gate 41. Flip-flops 37–39 are connected together to form a shift register. The outputs of each of flip-flops 37–39 is connected to respective inputs of an OR gate 42. The output of OR gate 42 is connected to a further input of AND gate 41. The output of flip-flop 40 is connected to a further input of OR gate 15, a further input of OR gate 16, and to a terminal 43. The signal at the output of terminal 43 is used to facilitate trouble-shooting. Units 36–42 together constitute a block 44 which detect errors in the alternation between main control signals and reference mark signals. Such an alternation is assumed to be required for the proper operation of output stage 31.

Terminal 22 is further connected to the set input S of a counter 46. Counter 46 has a carry output CO which furnishes an error signal indicative of the absence of reference mark signals. Counter 46 is preset to the number "Z" upon receipt of a reference mark signal at its S input. Further, it has a counting input C which is connected to terminal speed signal 21. The carry output of counter 46 is connected to a further input of OR gate 29.

Computer 17 has a test program for monitoring the functioning of auxiliary computer 30, applied over line 47 as well as its own functions and, in particular, the values of the parameters being applied through line 18–20. Such monitoring with the aid of a test program is disclosed in German Disclosure Document DE-OS No. 2, 903, 638, (to which U.S. Pat. No. 4,287,565 corresponds). The German Disclosure Document DE-OS No. 2 903 638 is entitled "Supervisory arrangement for program controlled devices" and discloses the following: A (monitoring or) supervisory arrangement is proposed for program controlled apparatus, for example microprocessor controlled systems in automotive vehicles, in which a differentiation is made between malfunctions occurring for short instants which are not due to the system, and repeatedly occurring disturbances or static defects. To this end, a control pulse, generated during each run of the program, is monitored, and upon failure of this control pulse an INTERRUPT or RESTART signal, respectively, is generated which causes a new start of the program and, if necessary, defines a time interval during which failure of a further control pulse places in operation an emergency circuit arrangement. Further, provisions are made which cause response of the emergency circuit arrangement upon continued absence of the control pulse. Finally, provisions are employed which effect that, upon starting of the monitoring or supervisory device, no alarm due to system operation will occur.

For example, a limit value test can be carried out, that is a test to determine whether the value is within a given range. If the test program discovers a malfunction or error in auxiliary computer 30 or an error in the main computer which still allows adequate functioning of the system, then a second indicator 48 is activated. This indicates to the operator that an error is present, but that this error has not lead to a switching to the auxiliary computer. Of course, if desired, an indication could be furnished as to whether the error was in the main computer or the auxiliary computer.

If, for example, the error indicates missing of a particular parameter value signal, such as a temperature signal, then the test program can also lead to switching to a simpler control program for the main computer, namely a program which does not utilize the value of the particular parameter which is missing.

OPERATION

The operation of the system in FIG. 1 will be explained, in particular with reference to the sequence error detecting stage 44, and with reference to the timing diagrams illustrated in FIG. 2. As previously mentioned, stage 44 is used to detect any lack of alternation between the reference marks signals and the main control signals.

Such alternation is required for proper operation of the system. Specifically, during correct functioning of the system, it is assumed that the trailing edge of a reference mark signal on terminal 22 must always be followed by the trailing edge of a main control signal from counter 17. The two signals are applied to flip-flop 36 which is responsive to the negative going edges of signals applied thereto. These signals are shown in graphs U22 and U17, FIG. 2. Under proper operation of the system, a pulse such as the first pulse in the sequence U 36 shown in FIG. 2 will be furnished.

Let it be assumed that after the second reference mark signal U22, no trailing edge signal of main control signal U 17 follows, i.e. that there is a malfunction of computer 17. Thus, flip-flop 36 remains set and, with the trailing edge of the next following reference mark signal, that is in FIG. 2 the third reference mark signal, the signal U36 is transferred over to flip-flop 37. Let it now be assumed that the malfunction affected only a single control signal U17, and that no further errors occur in the next few cycles. The signal U37 at the output of flip-flop 37 is shifted through flip-flops 38 and 39 by the trailing edge of the two next subsequent reference mark signals, see graphs U37, U38, U39 in FIG. 2. After three cycles, this signal is therefore no longer present. The signal at the output of OR gate 42 therefore again becomes a "0" signal. However, while a "1" signal was present at the output of OR gate 42, there was no simultaneous presence of signals U 22 and U 36. Therefore the signal at the output of AND gate 41 remain a "0" signal, so that flip-flop 40 could not be set. This shift register circuit thus prevents a single error from being registered if no error occurs in the three following cycles. Of course, instead of three following cycles which are error free, the number could be increased or decreased just by changing the number of stages in the shift register as constituted by flip-flops 37–39.

Let is now be assumed that computer 17 continues to malfunction so that three error-free cycles do not occur after a first missing signal U 17. In FIG. 2, this is shown to be the case following the seventh reference mark signal. Again, a signal is applied to shift register 37–39 following the error in the seventh cycle. A signal U 42 is again generated. While there is no error in the eighth cycle, the main control signal is again missing in the ninth cycle. Thus flip-flop 36 again remains set throughout the duration of the tenth reference mark signal. Signals are now simultaneously present in all inputs of AND gate 41. Flip-flop 40 is set by the trailing edge of the tenth reference mark signal U22. As a result, the program in main computer 17 is restarted by a signal applied through OR gate 16. Further, a signal is applied to hold circuit 25 through OR gate 15. The signal at terminal 43 can be used for trouble shooting purposes.

A program error detecting stage 14 monitors the running of the program of main computer 17. For this purpose the control program must furnish monitoring signals to the dynamic set input of counter 11. The counter is then set to the count of X. Counter 11 then counts down at a rate determined by the clock signals applied to terminal 10 until such time as the counter is again set to the count of X. If errors occur in the running of the program, for example if a particular program loop is passed through more than once, then the monitoring pulses will be applied too late to counter 11. In other words, counter 11 has reached the count of zero before being reset and therefore generates a "1" signal at its carry output CO. The latter is applied to OR gate 15.

The signal at the output of OR gate 15, that is a signal resulting from a signal applied to any of its inputs causes counter 13 to be set to the value Y. The latter starts to count down at a rate again determined by the clock frequency of pulses applied at terminal 10. Counter 13 has an inverting carry output. The "1" signals appears at this output for any count other than zero. The count Y is to be selected so that the error signal appearing at the output of counter 13 remains for a predetermined number of cycles. Circuit 25 thus prevents continuous switching between the main and the auxiliary computer during times when errors occur frequently. If counter 13 reaches the value of zero after the predetermined number of cycles, the clock input is blocked by AND gate 12. If additional errors occur during the countdown time of counter 13, the signal at the output of counter 13 is maintained throughout.

If an error signal is present at the D input of flip-flop 23, then the trailing edge of the next reference mark signal sets flip-flop 23. Switch 26 then causes the output stage 31 to be controlled by auxiliary computer 30 rather than main computer 17. Further, indicator 27 is activated so that this change in the control is indicated to the operator.

The reference mark signals as such are monitored in a reference mark signal monitoring, or error detecting stage 45. It is assumed that a reference mark signal BM must follow a predetermined number of speed pulses n. Therefore each reference signal BM causes counter 46 to be set to a value Z which is somewhat higher than the number of speed pulses n which are expected until occurrence of the next reference mark signal. Again, the value Z is counted down by the speed pulses n until such time as the count is reset by a new reference mark signal. If a reference mark signal is missing, counter 46 reaches the value of zero. This causes a carry signal to be generated at carry output CO which causes flip-flop 23 to be set directly through OR gate 29. It should be noted that flip-flop 23 is set directly without waiting to see whether another reference mark signal will be missing. The underlying assumption of this operation is that the computer would operate incorrectly in the absence of a plurality of reference mark signals and that it is therefore safer to switch to the auxiliary computer which, in the absence of reference mark signals, does not furnish any control signals. The system thus operates on the assumption that it is better to shut off the ignition system entirely than to operate with incorrect ignition timing.

In the illustrated embodiment a reference mark signal error causes a direct switching from the main to the auxiliary computer, while error signals in error detector stages 14 and 44 cause the switching from the main to the auxiliary computer to take place under reference mark signal control. Of course the error signals at the outputs of error detector stages 14 and 44 could also be applied directly to OR gate 29, ie. the switching of stage 26 could also take place directly in response to these error signals.

Signals applied externally at terminals 24 and 28 can also result in a switching from the main to the auxiliary computer. Signals applied through terminal 24 will cause a switching from the main to the auxiliary computer to take place under reference mark control, while those applied to terminal 28 will cause an immediate switching. These signals may be applied for trouble shooting purposes or may be the result of errors in some outside system such as, for example, a defective voltage regulator. Variations in supply voltage generally cause more problems with a microcomputer than with a control system which is constructed from discrete circuit elements.

Various changes and modifications may be made within the scope of the inventive concept.

We claim:

1. Internal combustion engine control system in which the engine operates in repetitive operating cycles and having at least one rotating shaft, said system including means (18, 22) for receiving reference mark signals (U22, BM, 19) in synchronization with shaft rotation;

means (18, 20, 21, 32, 33) for providing engine operating parameter signals representative of engine operating or operation parameters;

main computing means (17) connected to and controlled by the reference signals and by the engine parameter signals for furnishing main engine control signals (U17) at least in part in dependence on said reference mark signals, and wherein said control signals have a flank characteristic which alternates with a flank characteristic of said reference mark signals;

auxiliary computing means (30) connected to and controlled by said engine parameter signals (32, 33) providing auxiliary engine control signals during malfunction of said main computing means;

output means (31) for initiating a predetermined operation of said internal combustion engine in response to one of said control signals;

switch means (26) for selectively connecting said main computing means (17) or said auxiliary computing means (30) to said output means (31), and error signal generating means (44) connected
(a) to said reference mark signal supply means (22) and
(b) to said main computing means (17), responsive to the alternating sequencing of the reference mark signals (U22, BM) and to the main control signals (U17) including means (36, 40, 41) for sensing alternation of occurrence of said reference mark signals and said main engine control signals, and furnishing a first error signal in the absence of alternation between said main engine control signal and said reference mark signals;

and first counting means (37–42) connected to said first error signal generating means and having its output connected to said switch means (26) to control change-over thereof by connecting the auxiliary engine control signals from the auxiliary computer means (30) to the output means (31) instead of the main engine control signals (U17), if absence of alternation between said main engine control signals and said reference mark signals recurs during a predetermined counted number of sequential ones of said operating cycles.

2. System as set forth in claim 1, wherein said first error signal furnishing means furnishes said first error signal in the absence of a main control signal following one of said reference mark signals;

wherein said first counting means comprises shift register means having a plurality of stages, and means for shifting said first error signal through said shift register means under control of said reference mark signals; and wherein the alternation sensing means (36, 40, 41) are connected to said shift register means and to said switch means (26) for applying said output error signal to the switch means in response to the simultaneous presence of a shift register output signal and said first error signal.

3. System as set forth in claim 2, wherein said first error signal furnishing means comprises a flip-flop (36) having a set input for receiving said reference mark signals (U22, BM) and a reset input receiving said main control signals (U17).

4. System as set forth in claim 1, wherein said main computing means (17) is program controlled; and said main computing means furnishes a plurality of sequential monitoring signals, when said program is functioning correctly; and wherein means (14) for furnishing a second error signal are provided, comprising presettable counting means (11) having a set input (5) connected to receive said monitoring signal, a counting input (CC) for receiving clock pulses, and a carry output (CO) for furnishing said second error signal; and means (10) for applying clock signals to said clock input.

5. System as set forth in claim 4, further comprising hold circuit means (25) interconnected between said first (44) and second (14) error signal furnishing means, respectively, and said switching means (26) for furnishing said output error signal throughout a predetermined time interval in response to said first or said second error signal.

6. System as set forth in claim 5, further comprising means (24) for receiving external signals and applying said external signals to said hold circuit means (25).

7. System as set forth in claim 5, further comprising synchronizing means (23) interconnected between said hold circuit means (25) and said switching means (26) for synchronizing said output error signal to said reference mark signals.

8. System as set forth in claim 7, wherein said synchronizing means comprises a flip-flop.

9. System as set forth in claim 4, wherein said program is restartable by a restart pulse applied to said main computing means (17);

further comprising means (16) for applying said restart pulse to said main computing means in response to at least one of said first and second error signals.

10. System as set forth in claim 1, further comprising means (45) connected to said reference mark signal supply means (22) for furnishing a reference mark error signal when the interval between two sequential ones of said reference mark signals (U22,BM) extends a predetermined angle of rotation of said shaft.

11. System as set forth in claim 10, wherein said reference mark error signal furnishing means comprises a counter (46) preset to a first predetermined number (Z) by each of said reference mark signals, said counter having a counting input (C) for receiving speed-dependent pulses (n) and carry output (CO) for furnishing said reference mark error signal when the count on said counter reaches a second predetermined number.

12. System as set forth in claim 1, comprising indicator means (27) for furnishing a visual indication of presence of an output error signal.

13. System as set forth in claim 1, wherein said main computing means (17) further comprises a test program for testing said auxiliary computing means (30), said auxiliary computing means furnishing auxiliary output signals indicative of proper operation thereof;

and indicator means (48) for furnishing a visual indication signifying auxiliary computer malfunction in the absence of said auxiliary output signals.

* * * * *